(12) United States Patent
 Ghabour

(10) Patent No.: US 10,078,256 B2
(45) Date of Patent: Sep. 18, 2018

(54) DOCUMENT HOLDER FOR MOBILE DEVICE

(71) Applicant: Ehab Ghabour, Northborough, MA (US)

(72) Inventor: Ehab Ghabour, Northborough, MA (US)

(73) Assignee: LEDABOUR INC., Northborough, MA (US)

( * ) Notice: Subject to any disclaimer, the term of this patent is extended or adjusted under 35 U.S.C. 154(b) by 0 days.

(21) Appl. No.: 15/723,235

(22) Filed: Oct. 3, 2017

(65) Prior Publication Data

US 2018/0107100 A1   Apr. 19, 2018

Related U.S. Application Data

(60) Provisional application No. 62/408,817, filed on Oct. 16, 2016.

(51) Int. Cl.
| | | |
|---|---|---|
| *G03B 17/56* | (2006.01) | |
| *G03B 27/62* | (2006.01) | |
| *G03B 15/00* | (2006.01) | |

(52) U.S. Cl.
CPC ........... *G03B 17/568* (2013.01); *G03B 15/00* (2013.01); *G03B 17/561* (2013.01); *G03B 27/6207* (2013.01); *G03B 2215/00* (2013.01)

(58) Field of Classification Search
None
See application file for complete search history.

(56) References Cited

U.S. PATENT DOCUMENTS

| | | | | |
|---|---|---|---|---|
| 7,986,368 | B2* | 7/2011 | Lin | G06F 1/3231 348/373 |
| 8,781,311 | B1* | 7/2014 | Hatzav | H04N 1/04 396/5 |
| 9,491,344 | B2* | 11/2016 | Takabatake | H04N 5/2256 |
| 2004/0201776 | A1* | 10/2004 | Teong | H04M 1/0214 348/375 |
| 2007/0035655 | A1* | 2/2007 | Chen | H04N 1/04 348/373 |
| 2010/0080543 | A1* | 4/2010 | Yu | G03B 15/00 396/5 |

* cited by examiner

*Primary Examiner* — WB Perkey
(74) *Attorney, Agent, or Firm* — Robert Kaim

(57) ABSTRACT

Disclosed is a document holder assembly for attachment to a mobile device or its enclosure. The document holder assembly has an imaging position in which the document is positioned in the line of sight of the device camera, and a folded position in which the assembly is conveniently stored close to the attachment face. In some embodiments the distance between the document and the camera in the imaging position may be adjusted to achieve an optimum document image.

29 Claims, 5 Drawing Sheets

DOCUMENT HOLDER FOR MOBILE DEVICE

CROSS-REFERENCE TO RELATED APPLICATIONS

This application claims the benefit and priority of U.S. Provisional patent application Ser. No. 62/408,817 filed Oct. 16, 2015 entitled IDENTIFICATION CARD HOLDER FOR TABLET ENCLOSURES, the entire disclosure of which is incorporated herein by reference.

FIELD OF THE INVENTION

The invention relates in general to use of mobile devices to photograph documents, and more particularly to a document holder attachment to a mobile device.

BACKGROUND OF THE INVENTION

Mobile devices having a built-in rear-facing camera, including tablets, computers and smartphones are often used by organizations to provide customer check in upon arrival, to stream line front office staff work flow, and to improve customer experience. It is advantageous to both the staff and the customer to be able to use the mobile device to perform all required check-in functions, including capturing images of important documents such as identification documents, insurance cards or any other card or picture. One example of the use of mobile devices is in the field of health care. Examples of health care organizations making use of such devices include, but are not limited to, medical offices, physician offices, convenient care clinics, urgent care clinics, vaccine mobile clinics, blood donation mobile clinics, hospitals, federally qualified health centers and rural health centers. Other examples outside the health care field include check-in at hotels and customer-facing activities of business or government organizations.

In order to conveniently capture the image of a document, such as a card, it is necessary to have a document holder which attaches to the tablet or other mobile device, or to a device enclosure designed to enclose the tablet or other mobile device. The document must be easily inserted into the holder, and the holder must conveniently position the document within the field of view of the device camera so that a clearly focused image of the correct size will be produced.

Document holders of existing practice usually position the document at a fixed distance from the device camera, which may not be optimum for different mobile device types. Consequently, either camera focusing quality and image size is non-optimal, or a custom document holder must be provided for each different mobile device type.

A further problem with document holders of existing practice is that the document holder attachment is rigid and of fixed length, so that it is awkward and inconvenient to carry a hand held mobile device with the document holder in position.

Yet another problem with document holders of existing practice is that there is usually no provision for an external light source, so that image quality may suffer in low light conditions.

Therefore there exists a need for a document holder for attaching to a mobile device or a mobile device enclosure, wherein the document holder and the document holder arm may be folded away close to the mobile device when not in use, and wherein the document holder arm can be extended manually or automatically to position the document at an optimum position and distance relative to the device camera.

SUMMARY OF THE INVENTION

Accordingly, it is a primary objective of the present disclosure to provide a document holder attachment for a mobile device or mobile device enclosure, wherein the document holder attachment may be fixed, retractable or foldable.

It is further an objective of the present disclosure to provide a document holder attachment wherein the retracting or folding may be manual or automatic.

It is further an objective of the present disclosure to provide a document holder attachment which is flexible for use with different mobile devices.

It is further an objective of the present disclosure to provide a document holder attachment that has provision for a light source to better illuminate the document.

It is further an objective of the present disclosure to provide a document holder attachment which has provision for an external lens to enhance the image available from the built-in device camera.

These and other objectives are achieved by means of a document holder attachment which is foldable and which has a mounting arm comprising an arm mounting mechanism which may be modified to fit any device or device enclosure. In a first embodiment, the length of the mounting arm may be varied manually or automatically by means of adjustment screws. In a second embodiment, the mounting arm comprises at least three foldable attachments, such as hinges or ball joints, enabling the arm to be manually or automatically extended to various distances from the device camera, to be fixed in position for image capture, or to be retracted and folded for transport and storage. In a third embodiment, the mounting arm comprises two foldable attachments, such as hinges or ball joints, enabling the arm to be manually or automatically extended to a fixed distance suitable for a particular device camera, to be fixed in position for image capture or to be retracted and folded for transport and storage. In a fourth embodiment, the mounting arm comprises two foldable attachments, such as hinges or ball joints, and the arm may be extended telescopically, fixed in position for image capture or retracted and folded for transport and storage.

DETAILED DESCRIPTION OF PREFERRED EMBODIMENT

Figure 1:
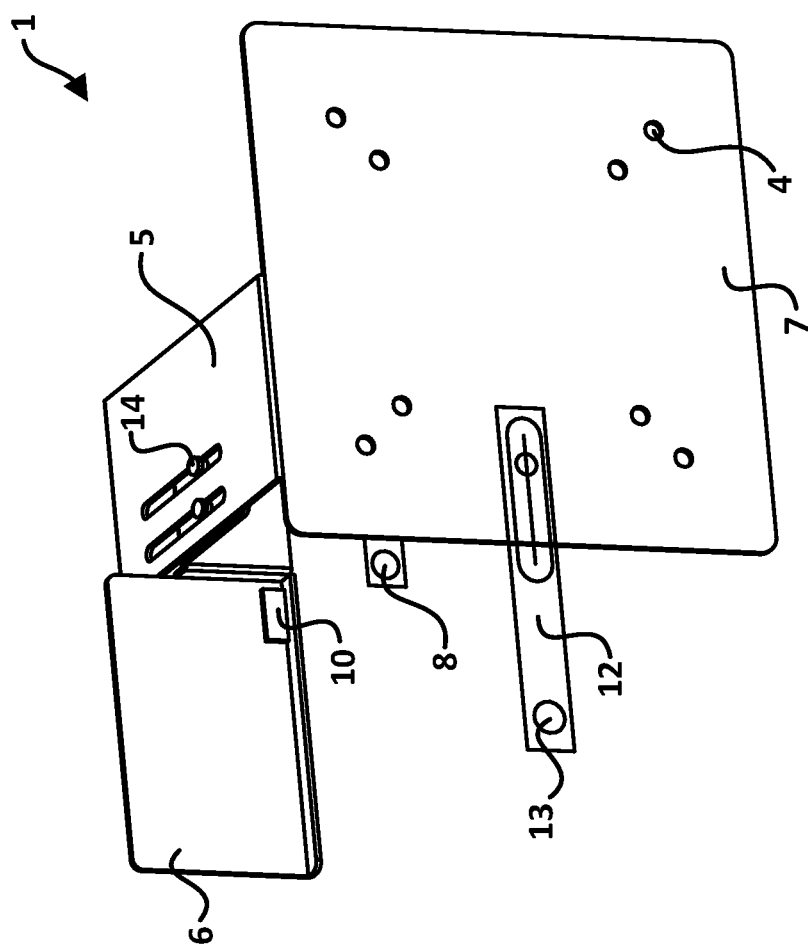
FIG. 1 is a diagram of a first embodiment of document holder assembly according to the present disclosure.

FIG. 1 shows a first embodiment of a document holder assembly 1 in which the distance between the document and a mobile device camera opening may be varied. Document holder assembly 1 comprises a mounting plate 7 having mounting holes 4, a mounting arm 5 whose length may be adjusted, for example by means of adjustment screws 14, and a document holder 6. Document holder 6 is configured to hold a document to be imaged or scanned by the mobile device camera, Mounting plate 7 has standard size mounting holes 4, and is a simple flat plate which may be easily configured to attach to an attachment face of any device or device enclosure. Note that use of mounting holes 4 is one method of attachment, but that mounting plate 7 may be attached to the attachment face by any other suitable method. For example, mounting plate 7 may be glued to the attachment face. Alternatively, mounting plate 7 may be attached by means of straps encircling the device or device enclosure, or by straps configured to attach to the corners of the device or device enclosure.

Note that, as illustrated in FIG. 1A, the length of mounting arm 5 may be manually adjusted and secured by means of adjustment screws 14. However other manual methods of adjusting and securing the length of mounting arm 5 for the purpose of optimizing device camera focusing and image size are possible, and all such methods are within the scope of the present disclosure. For example, mounting arm 5 may comprise a plurality of nested cylinders configured to telescopically vary the length of mounting arm 5. Moreover, automatic motor-controlled methods of adjusting the length of mounting arm 5 for the purpose of optimizing camera focusing and image size are also within the scope of the present disclosure. For example, adjustment screws 14 may be replaced by a screw mechanism for manually adjusting the length of mounting arm 5. In addition, the screw mechanism may be driven by directly by a motor, or by a motor connected with gears and the like, and the motor may be connected to a control system allowing control of the motor by an operator, or automatic control of the motor to optimize the length of mounting arm 5.

Document holder assembly 1 may optionally include a light source 8 to illuminate the document during scanning or imaging. Document holder assembly 1 may also optionally include a lens holder 12 configured to hold an optical lens 13, and to place optical lens 13 in front of the mobile device camera at an adjustable location and angle. The purpose of optical lens 13 is to control the magnification of the image of the document or a portion of the document.

Document holder 6 may optionally include a document sensor 10 configured to sense the presence of a document in document holder 6, and thereby to turn on light source 8 and/or to trigger scanning or imaging of the document.

Figure 2A:
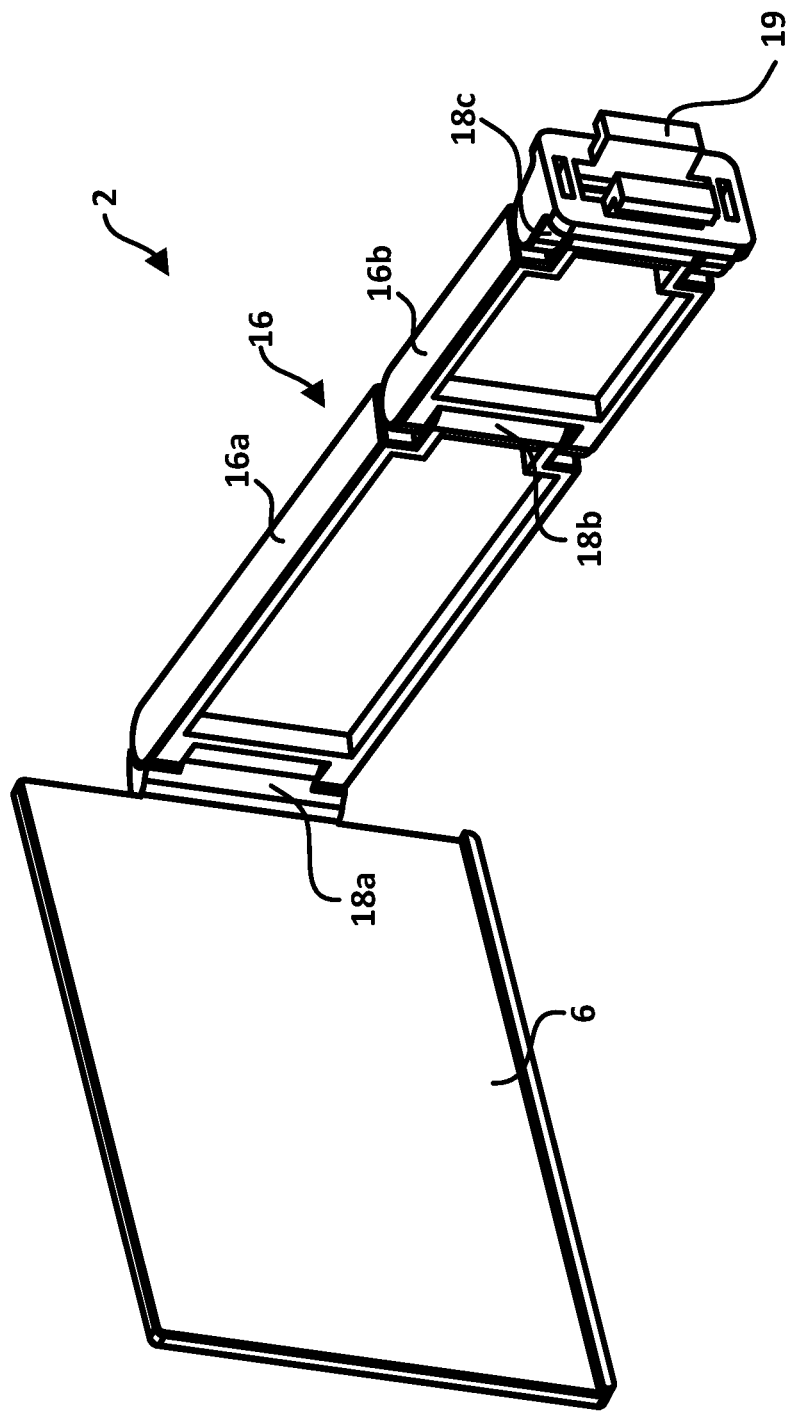
FIG. 2A is a diagram showing the imaging position of a second embodiment of a document holder assembly with an adjustable folding arm according to the present disclosure.

FIG. 2A shows a document holder assembly 2, which is a second embodiment of a document holder assembly according to the present disclosure. Document holder assembly 2 comprises an adjustable folding arm 16 which comprises arm sections 16a and 16b. Arm section 16a is hingeably attached with a hinge 18a to document holder 6, and arm section 16b is hingeably attached with a hinge 18c to an arm mounting mechanism 19. Arm sections 16a and 16b are attached to each other with a hinge 18b. Mounting mechanism 19 may be modified to allow document holder assembly 2 to be attached to any mobile device or device enclosure.

Note that by means of hinges 18a, 18b and 18c, the length of adjustable folding arm 16 may be varied, and document holder 6 may be positioned at adjustable distance and angle in front of the device camera, allowing optimization of the focus and image size. Adjustment of hinges 18a, 18b and 18c may be performed manually, or automatically by means of one or more motors. Note also that adjustable folding arm 16 may be completely folded back against an attachment face of the mobile device or device enclosure, thereby being conveniently stored in a non-obstructing location when document imaging is not required. When in the folded position, arm sections 16a and 16b and document holder 6 are substantially parallel to the attachment face and at a distance of less than 10 cm, and preferably less than 5 cm, from the attachment face.

It should also be noted that hinges 18a, 18b and 18c may be replaced by any other attachment devices, such as ball joints, which allow relative rotation between arm sections 16a and 16b, document holder 6 and mounting mechanism 19.

Figure 2B:
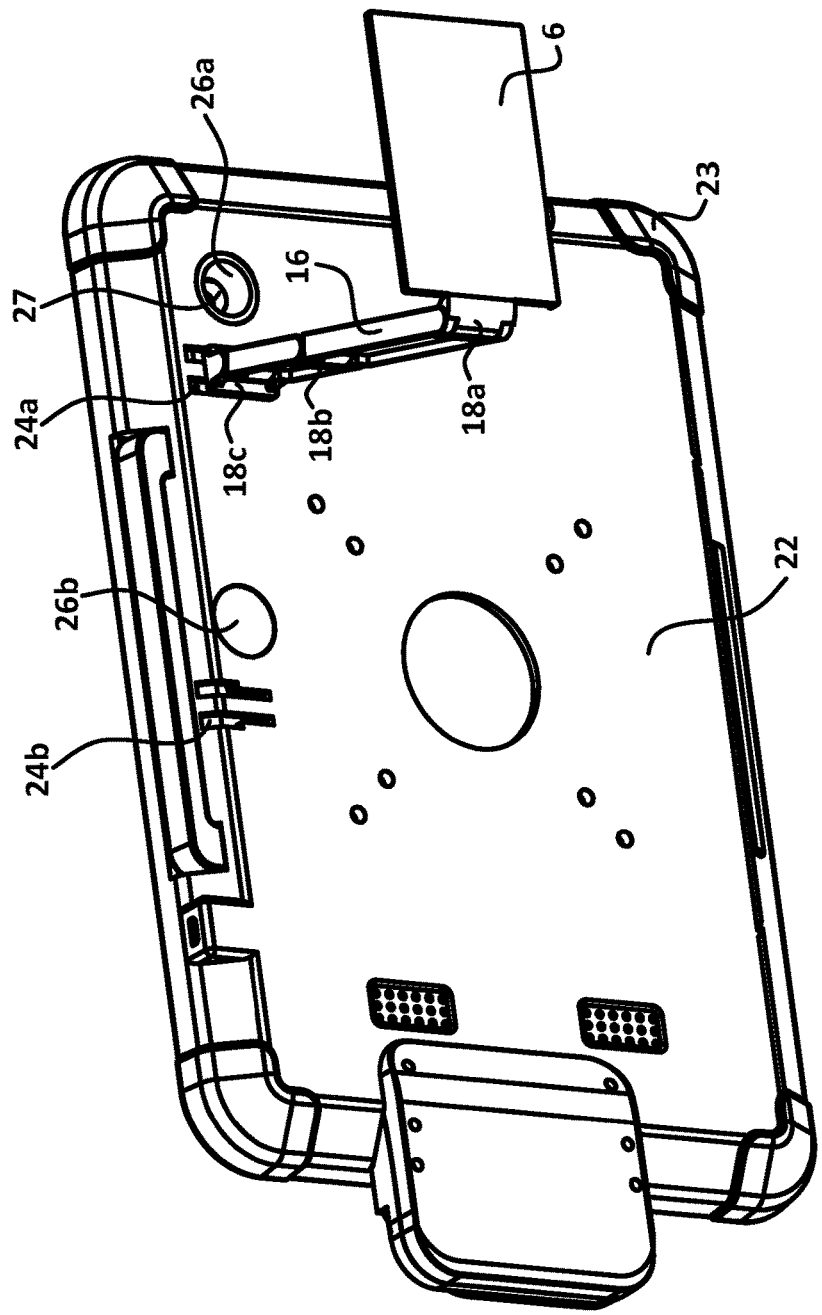
FIG. 2B is a diagram showing the second embodiment of a document holder assembly attached to a tablet enclosure.

FIG. 2B shows a view of document holder assembly 2 attached to an attachment face 22 of a mobile device enclosure 23. Mobile device enclosure 23 encloses a mobile device having a camera 27 which is aligned with a camera opening 26a in mobile device enclosure 23. Attachment face 22 has an enclosure attachment point 24a which is compatible with mounting mechanism 19, thereby allowing document holder assembly 2 to be securely attached to attachment face 22. As illustrated in FIG. 2B, document holder 6 is positioned so that the document is in direct line of sight of camera 27, with arm 16 fully extended so that document holder 6 is at a maximum distance from camera 27. By means of hinges 18a, 18b and 18c, and with either manual or automatic operation, the length of arm 16 may be varied to optimize the focus and size of the document image. Arm 16 may also be completely folded so that arm 16 and document holder 6 are parallel to and in close proximity to the surface of attachment face 22.

Attachment face 22 has an alternative camera opening 26b which is compatible with a different mobile device. When camera opening 26b is in use, document holder assembly 2 is attached to alternative enclosure attachment point 24b.

Figure 3A:
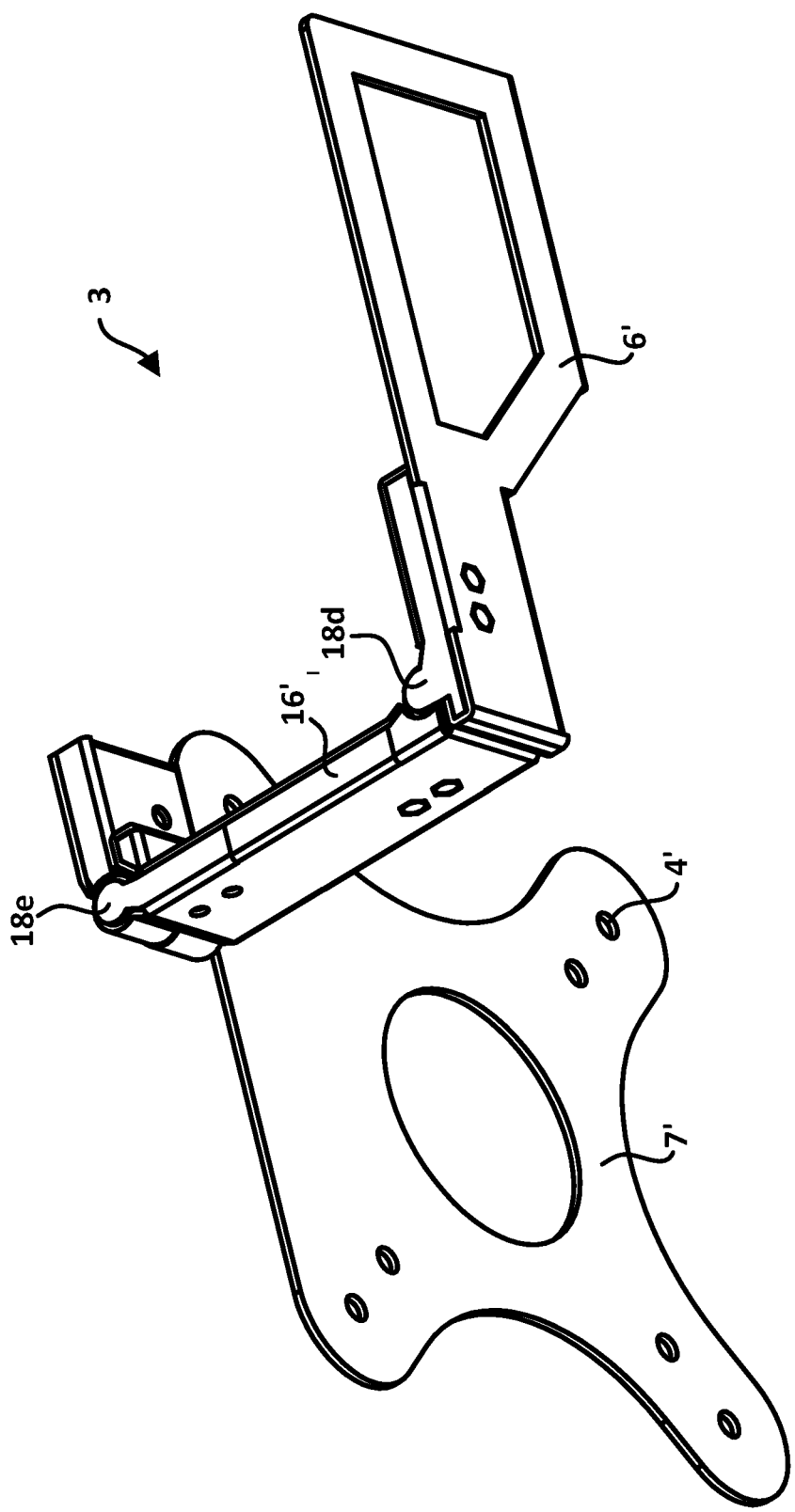
FIG. 3A is a diagram showing the imaging position of a third embodiment of a document holder assembly with a folding arm according to the present disclosure.
Figure 3B:
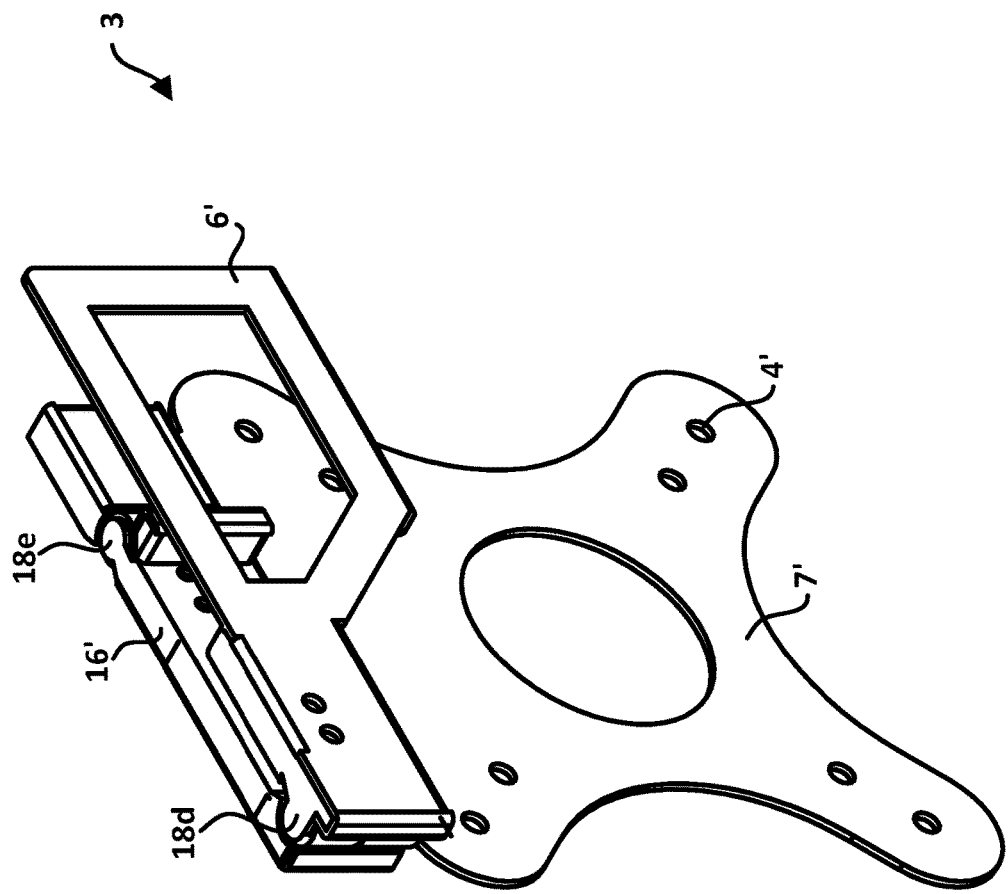
FIG. 3B is a diagram showing the folded position of the third embodiment of a document holder assembly according to the present disclosure.

FIG. 3A shows a document holder assembly 3, which is a third embodiment of a document holder assembly according to the present disclosure. Document holder assembly 3 comprises an arm 16' hingeably attached with a hinge 18d to a document holder 6', and hingeably attached with a hinge 18e to a mounting plate 7' having mounting holes 4' for attachment to a mobile device or device enclosure. Note that the length of arm 16' is not adjustable, and therefore the length of arm 16' is customized so that document holder 6' is positioned at an optimum distance relative to the camera of a particular mobile device. However, document holder assembly 3 is foldable, and FIG. 3B shows document holder assembly 3 in the folded position, wherein arm 16' and document holder 6' are substantially parallel to mounting plate 7'. Since mounting plate 7' is to be attached to attachment face 22 of a mobile device, in the folded position arm 16' and document holder 6' are substantially parallel to attachment face 22 and at a distance of less than 10 cm, and preferably less than 5 cm, from attachment face 22.

In a fourth embodiment of a document holder assembly according to the present disclosure (not shown), arm 16' may be replaced by plurality of nested cylinders configured to telescopically vary the length of mounting arm 16. Thus the fourth embodiment document holder assembly is foldable and can also position the document at variable distance from the device camera.

Although the present invention has been described in relation to particular embodiments thereof, it can be appreciated that various designs can be conceived based on the teachings of the present disclosure, and all are within the scope of the present disclosure.

What is claimed is:

1. A document holder assembly comprising:
   a mobile device having an attachment face and a device camera;
   a document;
   a document holder configured to attach to the attachment face, to hold the document and to position a document face of the document so that a document image of a document face portion is acquired by the device camera;
   a mounting arm attached at a first end with a first attachment to the document holder; and,
   an arm mounting mechanism attached to a second end of the mounting arm with a second attachment, wherein the arm mounting mechanism is configured to attach to the attachment face; and,
   wherein the document holder assembly has an imaging position and a folded position;
   wherein in the imaging position the document face is positioned in a plane perpendicular to a line of sight of the device camera and at an imaging distance from the device camera, wherein the document image has an optimum size and an optimum focus when the document face is at the imaging distance;
   wherein in the folded position the mounting arm and the document holder are substantially parallel to the attachment face and at a distance of less than 10 cm from the attachment face; and,
   wherein at least one of the first attachment and the second attachment is a ball joint.

2. The document holder assembly of claim 1 wherein the attachment face is a face of the mobile device.

3. The document holder assembly of claim 1 wherein the attachment face is a face of an enclosure enclosing the mobile device.

4. The document holder assembly of claim 1 wherein the arm mounting mechanism is a mounting plate.

5. The document holder assembly of claim 1 wherein the imaging distance is an adjustable imaging distance.

6. The document holder assembly of claim 5 wherein the first attachment comprises at least one slotted aperture in the mounting arm and at least one adjustment screw for adjustably attaching the document holder to the mounting arm, thereby allowing adjustment of the adjustable imaging distance.

7. The document holder assembly of claim 1 wherein the first attachment is a first hinge configured to allow a first rotation about a first axis and the second attachment is a second hinge configured to allow a second rotation about a second axis.

8. The document holder assembly of claim 5 wherein the first attachment is a first hinge configured to allow a first rotation about a first axis and the second attachment is a second hinge configured to allow a second rotation about a second axis and wherein the mounting arm further comprises a third hinge positioned between the first hinge and the second hinge and configured to allow a third rotation about a third axis, the mounting arm thereby having a first arm section between the first hinge and the third hinge and a second arm section between the third hinge and the second hinge.

9. The document holder assembly of claim 8 wherein the first rotation, the second rotation and the third rotation are adjusted so that the mounting arm is fully extended and the adjustable imaging distance is a maximum imaging distance.

10. The document holder assembly of claim 8 wherein the first rotation, the second rotation and the third rotation are adjusted to position the document holder assembly in the folded position.

11. The document holder assembly of claim 8 wherein the first rotation, the second rotation and the third rotation are activated manually.

12. The document holder assembly of claim 8 wherein the first rotation, the second rotation and the third rotation are activated by at least one motor.

13. The document holder assembly of claim 7 wherein the first rotation and the second rotation are adjusted to position the document holder assembly in the imaging position.

14. The document holder assembly of claim 7 wherein the first rotation and the second rotation are adjusted to position the document holder assembly in the folded position.

15. The document holder assembly of claim 7 wherein the first rotation and the second rotation are activated manually.

16. The document holder assembly of claim 7 wherein the first rotation and the second rotation are activated by at least one motor.

17. The document holder assembly of claim 1 further comprising a light source configured to illuminate the document face.

18. The document holder assembly of claim 1 further comprising a lens holder configured to hold an optical lens between the document face and the device camera, wherein the lens is configured to control a document face portion magnification.

19. The document holder assembly of claim 1 wherein the document holder further comprises a document sensor configured to sense the presence of the document on the document holder and thereby to initiate acquisition of the document image by the device camera.

20. The document holder assembly of claim 1 wherein the document holder further comprises a document sensor configured to sense the presence of the document on the document holder and thereby to initiate illumination of the document face by the light source.

21. The document holder assembly of claim 1 wherein the document face portion is the entire document face.

22. The document holder assembly of claim 1 wherein the document is an identification card.

23. The document holder assembly of claim 1 wherein the document is a medical insurance card.

24. The document holder assembly of claim 1 wherein the document is a driver's license.

25. The document holder assembly of claim 1 wherein the document is a membership card.

26. The document holder assembly of claim 1 wherein the mobile device is a tablet device.

27. The document holder assembly of claim 5 wherein the mounting arm comprises a plurality of nested cylinders configured to telescopically vary the adjustable imaging distance.

28. The document holder assembly of claim 1 wherein the first attachment is a first ball joint configured to allow a first rotation about a first axis and the second attachment is a second ball joint configured to allow a second rotation about a second axis.

29. The document holder assembly of claim 5 wherein the first attachment is a first ball joint configured to allow a first rotation about a first axis and the second attachment is a second ball joint configured to allow a second rotation about a second axis and wherein the mounting arm further comprises a third ball joint positioned between the first ball joint and the second ball joint and configured to allow a third rotation about a third axis, the mounting arm thereby having a first arm section between the first ball joint and the third ball joint and a second arm section between the third ball joint and the second ball joint.

* * * * *